US010546257B2

(12) United States Patent
Dunne et al.

(10) Patent No.: US 10,546,257 B2
(45) Date of Patent: Jan. 28, 2020

(54) OPTIMIZING EVENT AGGREGATION IN AN EVENT-DRIVEN SYSTEM

(71) Applicant: International Business Machines Corporation, Armonk, NY (US)

(72) Inventors: Sean Dunne, Dublin (IE); Martin A. Flint, Dublin (IE); Liam Harpur, Dublin (IE); Peter M. McGrath, Ratoath (IE)

(73) Assignee: International Business Machines Corporation, Armonk, NY (US)

( * ) Notice: Subject to any disclaimer, the term of this patent is extended or adjusted under 35 U.S.C. 154(b) by 355 days.

(21) Appl. No.: 15/149,452

(22) Filed: May 9, 2016

(65) Prior Publication Data

US 2017/0323237 A1 Nov. 9, 2017

(51) Int. Cl.
*G06Q 10/06* (2012.01)

(52) U.S. Cl.
CPC .............................. *G06Q 10/06312* (2013.01)

(58) Field of Classification Search
CPC .................... G06F 7/30; G06Q 10/06; G06Q 10/00–99/00
See application file for complete search history.

(56) References Cited

U.S. PATENT DOCUMENTS

| | | | | |
|---|---|---|---|---|
| 6,587,848 | B1 * | 7/2003 | Aggarwal | G06F 16/33 |
| 7,496,567 | B1 * | 2/2009 | Steichen | G06F 16/353 |
| 8,028,052 | B2 | 9/2011 | Larkin et al. | |
| 8,756,189 | B2 | 6/2014 | Zhang | |
| 9,128,773 | B2 | 9/2015 | Beaty et al. | |
| 2003/0217033 | A1 * | 11/2003 | Sandler | G06F 16/2264 |
| 2005/0071320 | A1 * | 3/2005 | Chkodrov | G06Q 10/087 |
| 2007/0103984 | A1 * | 5/2007 | Kavuri | G06F 3/0605 |
| | | | | 365/185.17 |
| 2012/0311562 | A1 | 12/2012 | Wang et al. | |
| 2013/0204905 | A1 * | 8/2013 | Ioffe | H04L 9/00 |
| | | | | 707/803 |
| 2013/0347007 | A1 | 12/2013 | Lee et al. | |
| 2015/0363481 | A1 * | 12/2015 | Haynes | G06Q 10/10 |
| | | | | 707/748 |

FOREIGN PATENT DOCUMENTS

| | | | |
|---|---|---|---|
| AU | 2008256623 B2 * | 1/2014 | ....... G06F 16/24565 |
| JP | 2004520644 A | 7/2004 | |
| WO | 2015167496 A1 | 11/2015 | |

OTHER PUBLICATIONS

Krishnamachari, L & Estrin, Deborah & Wicker, Stephen. (2002). Impact of data AGgregation in Wireless Sensor Networks. 575-578. 10.1109/ICDCSW.2002.1030829. (Year: 2002).*

(Continued)

*Primary Examiner* — Alan S Miller
*Assistant Examiner* — Jay-Ming Wang
(74) *Attorney, Agent, or Firm* — Bryan D. Wells

(57) ABSTRACT

Optimization of event aggregation in an event-driven system is provided. An event queue is queried for a current event. A workload affinity coefficient that describes the current event, at least in part, is read. A database is searched for one or more matching workload affinity coefficients. The current event and one or more events that are respectively associated with one or more matching workload affinity coefficients are aggregated, thereby generating an aggregated event.

17 Claims, 5 Drawing Sheets

(56) References Cited

OTHER PUBLICATIONS

Lumezanu et al., "Utility Optimization for Event-Driven Distributed Infrastructures", Proceedings of the 26th IEEE International Conference on Distributed Computing Systems (ICDCS'06), © 2006 IEEE, 10 pages.

Qi et al., "Complex Event Analytics: Online Aggregation of Stream Sequence Patterns", SIGMOD '14, Jun. 22-27, 2014, Snowbird, UT, USA, Copyright 2014 ACM 978-1-4503-2376-5/14/06, pp. 229-240.

"Enabling predictive analysis in service oriented BPM solutions", White Paper, Mindtree, printed on Feb. 24, 2016, pp. 1-8.

"Overview of the Event Processing Language (EPL)", Oracle, printed on Feb. 23, 2016, <http://docs.oracle.com/cd/E14571_01/apirefs.1111/e14304/overview.htm>, 25 pages.

* cited by examiner

In → Out

| Key | List |
|---|---|
| E_InTxnMapped<#1> | E_Valid<#1> {75}<br>E_Valid<#2> {10}<br>E_Valid<#3> {1}<br>E_Invalid<#1> {1} |
| E_InTxnMapped<#2> | E_Valid<#1> {52}<br>E_Valid<#2> {12}<br>E_Invalid<#1> {1} |
| E_InTxnMapped<#3> | E_Valid<#2> {25} |
| E_Valid<#1> | E_Next<#5> {127} |
| E_Valid<#2> | E_Next<#5> {47} |

FIG. 3A

Out → In

| Key | List |
|---|---|
| E_Valid<#1> | E_InTxnMapped<#1> {75}<br>E_InTxnMapped<#2> {52} |
| E_Valid<#2> | E_InTxnMapped<#3> {25}<br>E_InTxnMapped<#2> {12}<br>E_InTxnMapped<#1> {10} |
| E_Valid<#3> | E_InTxnMapped<#1> {1} |
| E_Invalid<#1> | E_InTxnMapped<#2> {1} |
| E_Next<#5> | E_Valid<#1> {127}<br>E_Valid<#2> {47} |

FIG. 3B

OPTIMIZING EVENT AGGREGATION IN AN EVENT-DRIVEN SYSTEM

TECHNICAL FIELD

The present invention relates generally to the field of event-driven systems, and more particularly, to optimizing event aggregation in an event-driven system.

BACKGROUND

In an event driven system, events occur in response to a change in state of the system. In general, an event is generated at a producer, also known as an emitter or agents, and carries information that describes the change in the system and how the change effects various parts of the system. Events can be queued for processing, and a consumer, also known as a sink, can read events from a queue to select events for further processing.

One exemplary application for event-driven systems is payment processing, such as credit-card payment processing, in which multiple events are associated with each transaction. In general, these types of transaction processing systems must process a high volume of events. Because processing such events individually can be inefficient, it is advantageous to aggregate similar events together. For example, event aggregation can provide a reduced number of parses, a reduced number of serializations, a reduced number of input/out (I/O) operations, and/or increased structured query language (SQL) efficiency.

SUMMARY

According to one embodiment of the present invention, a method for optimizing event aggregation in an event-driven system is provided. The method includes: querying, by one or more computer processors of a consumer, an event queue for a current event; reading, by one or more computer processors of the consumer, a workload affinity coefficient that describes, at least in part, the current event; searching, by one or more computer processors of the consumer, a database for one or more matching workload affinity coefficients; and aggregating, by one or more computer processors of the consumer, the current event and one or more events that are respectively associated with the one or more matching workload affinity coefficients, thereby generating an aggregated event.

According to another embodiment of the present invention, a computer program product for optimizing event aggregation in an event-driven system is provided. The computer program product comprises a computer readable storage medium and program instructions stored on the computer readable storage medium. The program instructions include: program instructions to, at a consumer, query event queue for a current event; program instructions to, at the consumer, read a workload affinity coefficient that describes, at least in part, the current event; program instructions to, at the consumer, search a database for one or more matching workload affinity coefficients; and program instructions to, at the consumer, aggregate the current event and one or more events that are respectively associated with the one or more matching workload affinity coefficients, thereby generating an aggregated event.

According to another embodiment of the present invention, a computer system for optimizing event aggregation in an event-driven system is provided. The computer system includes one or more computer processors, one or more computer readable storage media, and program instructions stored on the computer readable storage media for execution by at least one of the one or more processors. The program instructions include: program instructions to, at a consumer, query event queue for a current event; program instructions to, at the consumer, read a workload affinity coefficient that describes, at least in part, the current event; program instructions to, at the consumer, search a database for one or more matching workload affinity coefficients; and program instructions to, at the consumer, aggregate the current event and one or more events that are respectively associated with the one or more matching workload affinity coefficients, thereby generating an aggregated event.

BRIEF DESCRIPTION OF THE DRAWINGS

FIGS. 3A and 3B depict tables that visually illustrate data structures that store examples of dependency data for various events in an event-driven system, in accordance with an embodiment of the present invention.

DETAILED DESCRIPTION

In general, event aggregation in an event-driven system can be accomplished at producer(s) during initial workload ingestion at the time at which events are generated and published. This type of event aggregation is known as "aggregation at source." While "aggregation at source" can improve workload processing performance significantly, embodiments of the present invention recognize that, under various conditions, aggregation can occur sub-optimally. For example, low messaging rates generally reduce the viability of "aggregation at source." Performance requirements specifying low latency can also reduce the viability of "aggregation at source." Additionally, a large number of consumers reading from an event queue (i.e., an event-driven system in which a large number of threads are executing) can deplete the event queue, resulting in sub-optimal event aggregation during workload ingestion. Furthermore, it is also possible for optimally source-aggregated workloads to become fragmented over time as a consequence of events relating to the same transaction taking different processing paths, resulting in non-aggregated follow-on events.

Embodiments of the present invention provide for aggregation at consumer(s) in addition to or in place of "aggregation at source." In event-driven systems in which "aggregation at source" is not provided, or in event-driven systems in which "aggregation at source" is occurring sub-optimally, aggregating events at consumer(s) can provide similar benefits to optimally aggregating events at producer(s) (i.e., event-driven systems in which "aggregation at source" is occurring optimally). In general, embodiments of the present inventions facilitate decision-making during ingestion of a current event at a consumer such that the consumer can recognize event(s) that (i) can be aggregated with the current event, (ii) can be processed prior to the current event to generate event(s) that will likely aggregate with the current event, and (iii) can be processed such that events generated by processing the current event will likely aggregate with events generated by processing the recognized event(s). Various embodiments of the present invention advantageously provide one or a combination of any of the aforementioned benefits. Additionally, "aggregation," as used herein, denotes combining a plurality of events into a single, aggregated event for processing and not merely collecting similar events and processing the events individually.

Figure 1:
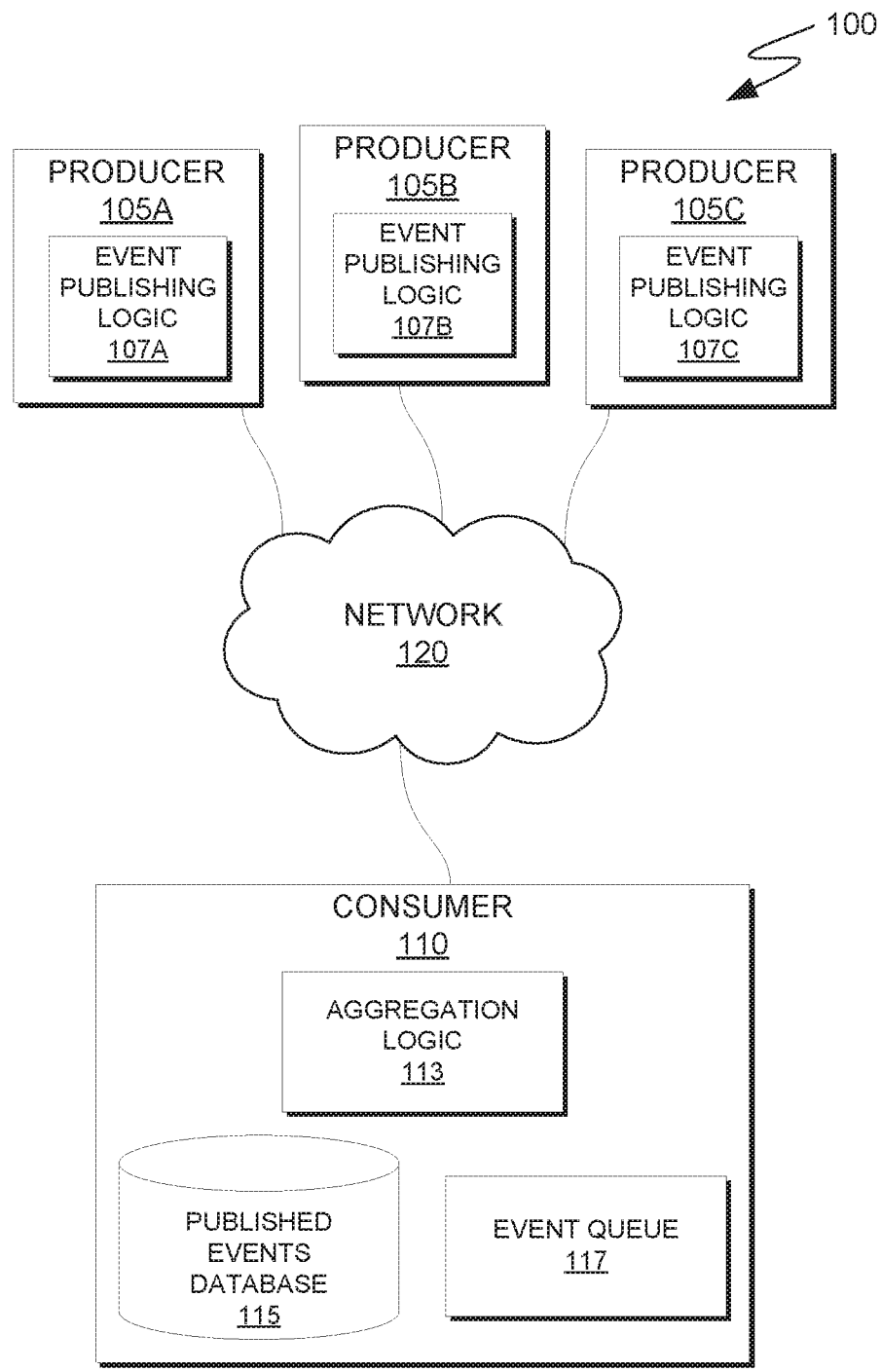
FIG. 1 is a functional block diagram illustrating a computing environment, in accordance with an embodiment of the present invention.

Embodiments of the present invention will now be described in detail with reference to the Figures. FIG. 1 is a functional block diagram illustrating a computing environment, in accordance with an embodiment of the present invention. For example, FIG. 1 is a functional block diagram illustrating computing environment 100. Computing environment 100 includes producer 105A, producer 105B, producer 105C (collectively referred to as producers 105), and consumer 110, which are communicatively connected via network 120, as depicted in FIG. 1. Producers 105 include respective instances of event publishing logic 107 (i.e., event publishing logic 107A, 107B, and 107C). Consumer 110 includes aggregation logic 113, published events database 115, and event queue 117.

In various embodiments, each of producer 105A, 105B, and 105C is a computing device at which events are generated and published for further processing by consumer 110 or another computing device that functions as a consumer in the event-driven system. In general, each producer of producers 105 can be a standalone device such as a credit-card reader, a server, a laptop computer, a tablet computer, a netbook computer, a personal computer (PC), or a desktop computer. In other embodiments, each producer of producers 105 can represent a computing system utilizing clustered computers and components to act as a single pool of seamless resources. In general, each producer of producers 105 can be any computing device or a combination of devices with access to consumer 110 via network 120, and with access to and/or capable of executing a respective instance of event publishing logic 107 (i.e., one of event publishing logic 107A, 107B, and 107C). In various embodiments, producers 105 can represent any combination of computing devices. Additionally, computing environment 100 can include a greater or lesser number of producers 105 executing respective instances of event publishing logic 107 without departing from the scope of the present invention. Each producer of producers 105 can include internal and external hardware components, as depicted and described in further detail with respect to FIG. 5. In some embodiments, for example, producers 105 represent respective thread(s) executing a respective instance of event publishing logic 107 on one or more cores of processor(s) 502; in such embodiments, instances of event publishing logic 107 can be stored in cache 506, memory 504, or persistent storage 510 at various stages of execution.

In the embodiment depicted in FIG. 1, instances of event publishing logic 107 are stored on respective producers. In other embodiments, one or more instances of event publishing logic 107 can reside on another computing device, provided that each such instance can access and is accessible by a respective producer. In yet other embodiments, one or more instances of event publishing logic 107 can reside externally and can be accessed through a communication network, such as network 120. In general, when an event is generated at one of producers 105, a respective instance of event publishing logic 107 operates to, in various embodiments of the present invention, do one or more of (i) generating metadata that describes various aspects of the event, (ii) determining whether or not the event was generated in response to a previous event, (iii) determining whether or not any subsequent events are generated in response to a consumer processing the event, and/or (iv) determining a count of occurrences of various events, as discussed with respect to FIG. 2. Additionally, one or more instances of event publishing logic 107 can aggregate generated events at a respective producer of producers 105 via the "aggregation at source" method as an initial optimization step in some embodiments of the present invention.

In various embodiments of the present invention, network 120 can be a local area network (LAN), a wide area network (WAN) such as the Internet, or a combination of the two, and may include wired, wireless, fiber optic or any other connection known in the art. In general, network 120 can be any combination of connections and protocols that will support communications between producers 105 and consumer 110, in accordance with a desired embodiment of the present invention. Additionally, network 120 represents communications fabric 508 and/or components of processor(s) 502 that facilitate inter-core communication in some embodiments of the present invention.

In various embodiments, consumer 110 is a computing device at which events that are published by producers 105 are processed. In general, consumer 110 can be a standalone device such as a server, a laptop computer, a tablet computer, a netbook computer, a personal computer (PC), or a desktop computer. In other embodiments, consumer 110 can represent a computing system utilizing clustered computers and components to act as a single pool of seamless resources. In general, consumer 110 can be any computing device or a combination of devices that is communicatively connected to producers 105 via network 120, has access to published events database 115 and event queue 117, and can execute aggregation logic 113. In various embodiments, computing environment 100 can include a greater or lesser number of consumer computing devices (i.e., multiple instances of consumer 110) without departing from the scope of the present invention. Additionally, consumer 110 can include internal and external hardware components, as depicted and described in further detail with respect to FIG. 5. In some embodiments, consumer 110 represents a thread executing on one or more cores of processor(s) 502; in such embodiments, aggregation logic can be stored in cache 506, memory 504, or persistent storage 510 at various stages of execution.

In the embodiment depicted in FIG. 1, aggregation logic 113, published events database 115, and event queue 117 are stored on consumer 110. In other embodiments, one or more of aggregation logic 113, published events database 115, and event queue 117 can reside on another computing device in computing environment 100, including computing devices that are not depicted in FIG. 1, provided that consumer 110 can execute aggregation logic 113 and can access one or both of published events database 115 and event queue 117. In general, when producers 105 publish one or more events to published events database 115, as discussed with respect to FIGS. 2 and 3, consumer 110 executes aggregation logic 113 to populate or update event queue 117 and aggregate events as discussed with respect to FIG. 4.

Published events database 115 is a data repository that can be written to and read by one or both of producers 105 and consumer 110 in various embodiments of the present invention. For example, producers 105 can write data describing one or more events to published events database 115 that includes, for each event, data describing a workload affinity coefficient, as discussed with respect to FIG. 2, and dependency data, as discussed with respect to FIGS. 2 and 3. In some embodiments, published events database 115 can be written to and read by programs and entities outside of computing environment 100 in order to populate published events database 115 with information. Additionally, published events database 115 can provide, at least in part, the functionality of event queue 117, as described hereafter. In some embodiments, for example, aggregation logic 113 manages one or more pointers in published events database 115 to indicate (i) address(es) in memory at which producers 105 can write data and/or (ii) event(s) that aggregation logic 113 has yet to process. In various embodiments, producers 105 can manage one or pointers in published events database 115 to indicate address(es) in a computer memory and/or persistent storage device at which producers 105 have written data. In embodiments that include a plurality of instances of consumer 110, a computing device other than an instance of consumer 110 can store published events database 115, provided that each instance of consumer 110 can access published events database 115 via a network, such as network 120 or a local intranet.

Event queue 117 is a data repository that can be written to and read by one or both of producers 105 and consumer 110 in various embodiments of the present invention. In general, event queue 117 is a resource that enables aggregation logic 113 to locate events that producers 105 publish in published events database 115 and track which events aggregation logic 113 has processed. In embodiments that include multiple instance of consumer 110, each instance of consumer 110 can manage event queue 117 to identify events in published events database 115 for aggregation and/or processing; in such embodiments, a computing device other than an instance of consumer 110 can store event queue 117, provided that each instance of consumer 110 can access event queue 117 via a network, such as network 120 or a local intranet. As discussed above, however, published events database 115 can include the features of event queue 117; in such embodiments, computing environment 100 omits event queue 117.

Figure 2:
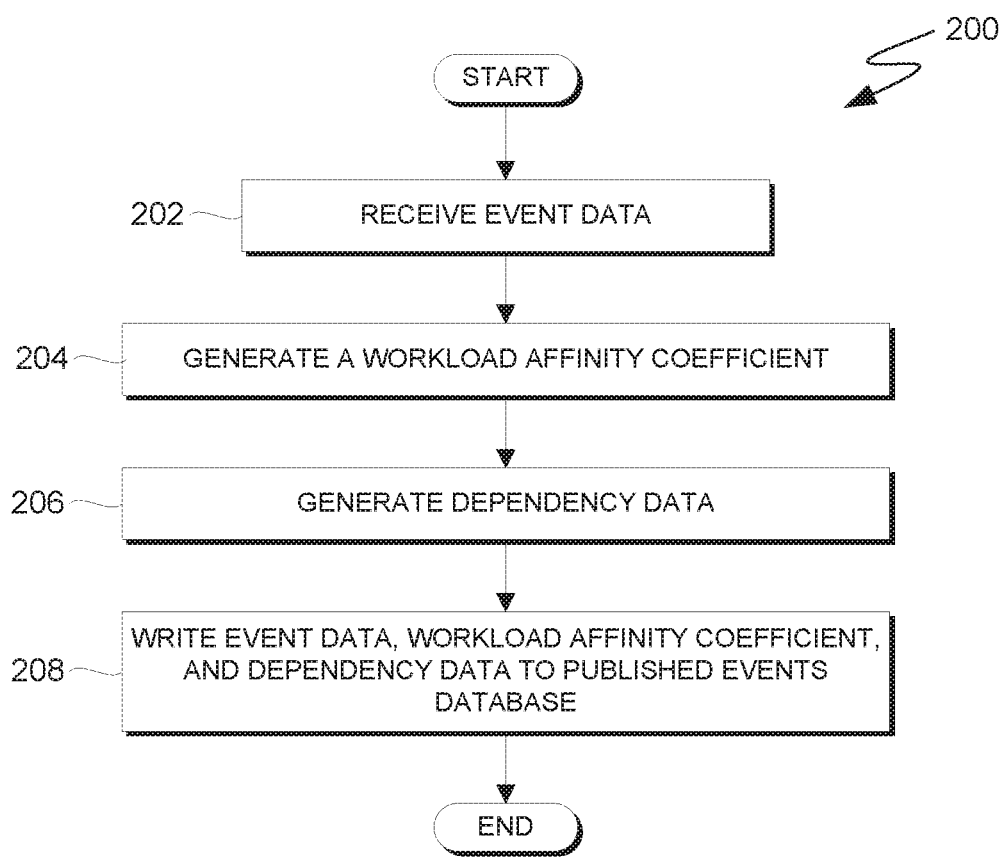
FIG. 2 is a flowchart depicting operations for generating events in an event-driven system that supports event aggregation at a consumer, on a computing device within the computing environment of FIG. 1, in accordance with an embodiment of the present invention.

FIG. 2 is a flowchart depicting operations for generating events in an event-driven system that supports event aggregation at a consumer, on a computing device within the computing environment of FIG. 1, in accordance with an embodiment of the present invention. For example, FIG. 2 is a flowchart depicting operations 200 of an instance of event publishing logic 107 on a producer of producers 105 within computing environment 100. A producer of producers 105 that is executing an instance of event publishing logic 107 executes an iteration of operations 200 for each event that is generated by the producer.

In operation 202, an instance of event publishing logic 107 receives event data that is generated at the producer on which the instance of event publishing logic 107 is executing. In one example, the received event data describes a stage in a credit-card payment transaction. Based on the received event data, the instance of event publishing logic 107 generates a workload affinity coefficient for the event in operation 204. In general, the workload affinity coefficient generated in operation 204 is metadata that describes the event. In various embodiments, the workload affinity coefficient is generated based on the name of the event, and in some embodiments, one or more context values that describe various aspects of the event. In general, it is advantageous to generate the workload affinity coefficient based on the name of the event and one or more context values when it is not possible to aggregate events at one of producers 105 based on the one or more context values (i.e., where it is not possible to aggregate events via "aggregation at source," as previously discussed). In one example of an embodiment in which workload affinity coefficients are generated based on one or more context values, the workload affinity coefficients are calculated from a string that includes the event name and the one or more context values using a Java® "hashCode" method or another method for calculating suitable hash values. As discussed with respect to FIG. 4, associating events with hash values (e.g., respective nHash values) that are based on one or more context values enables aggregation logic 113 of consumer 110 to select potentially aggreagatable events from published events database 115 and advantageously supplant or supplement aggregation of events at producers 105 that is or would be sub-optimal (i.e., supplant or supplement "aggregation at source" via the instance of event publishing logic 107).

In the embodiment depicted in FIG. 2, the instance of event publishing logic 107 executing operations 200 generates dependency data for the event in operation 206. In general, the dependency data generated in operation 206 describes events that are related to the event for which data was received in operation 202 and for which a workload affinity coefficient was generated in operation 204 during the same iteration of operations 200 (i.e., a current event). For example, the generated dependency data can describe one or more events that preceded and/or generated the current event (e.g., a preceding event in the same transaction as the current event) and/or one or more dependent, subsequent events that are generated as a result of consumer 110 processing the current event. Accordingly, the instance of event publishing logic 107 and the respective producer of producers 105 can include hardware and software and store information that permits a determination of how events are related (e.g., an order in which events relating to a particular transaction were published) and provides a capability to store data describing a plurality of received events. The generated dependency data can also include data that describes count(s) of occurrences of (i) the current event, (ii) any preceding events, (iii) any dependent, subsequent events, or (iv) any combination of the current event, preceding event(s), and dependent, subsequent event(s). Specific examples of dependency data are discussed with respect to FIGS. 3A and 3B. In operation 208, the instance of event publishing logic 107 publishes (i.e., writes) the received event data, the generated workload affinity coefficient, and the generated dependency data to published events database 115.

FIGS. 3A and 3B depict tables that visually illustrate data structures that store examples of dependency data for various events in an event-driven system, in accordance with an embodiment of the present invention. In some embodiments, dependency data like the dependency data depicted in FIGS. 3A and 3B is based on data compiled from among a plurality of producers of producers 105. In other embodiments, dependency data like the dependency data depicted in FIGS. 3A and 3B is based on data from individual producers of producers 105, in which case each producer of 105 is associated with tables similar to those depicted in FIGS. 3A and 3B respectively.

FIG. 3A, depicts a table that identifies, in the "List" column, events that, in various embodiments, one or more of producers 105 publish in response to publishing various preceding events, as identified in the "Key" column. For example, one or more of producers 105 published an event represented by "E_Valid<#1>" in response to publishing a preceding event represented by "E_InTxnMapped<#1>". Similarly, one or more of producers 105 published events represented by "E_Valid<#2>", "E_Valid<#3>", and "E_Invalid<#1>" in response to publishing the preceding event represented by "E_InTxnMapped<#1>". Additionally, the table depicted in FIG. 3A includes, in brackets, counts of occurrences of the events that were published in response to the various preceding events. After publishing the preceding event represented by "E_InTxnMapped<#1>", for example, one or more producer of producers 105 have, as of the point in time depicted in FIG. 3A, published the event represented by "E_Valid<#1>" seventy-five times, published the event represented by "E_Valid<#2>" ten times, published the event represented by "E_Valid<#3>" once, and published the event represented by "E_Invalid<#1>" once.

FIG. 3B, depicts a table that identifies, in the "List" column, events that, in various embodiments, one or more of producers 105 published prior to publishing various dependent, subsequent events, as identified in the "Key" column. For example, one or more of producers 105 published an event represent by "E_InTxnMapped<#1>" prior to publishing a dependent, subsequent event represented by "E_Valid<#1>". Similarly, one or more of producers 105 published an event represented by "E_InTxnMapped<#2>" prior to publishing the dependent, subsequent event represented by "E_Valid<#1>". Additionally, the table depicted in FIG. 3B includes, in brackets, counts of occurrences of the events that are published prior to the various dependent, subsequent events. Prior to publishing the event represent by "E_Invalid<#1>", for example, one or more of producers 105 have, as of the point in time depicted in FIG. 3B, published the event represented by "E_InTxnMapped<#1>" seventy-five times and published the event represented by "E_InTxnMapped<#2>" fifty-two times.

Figure 4:
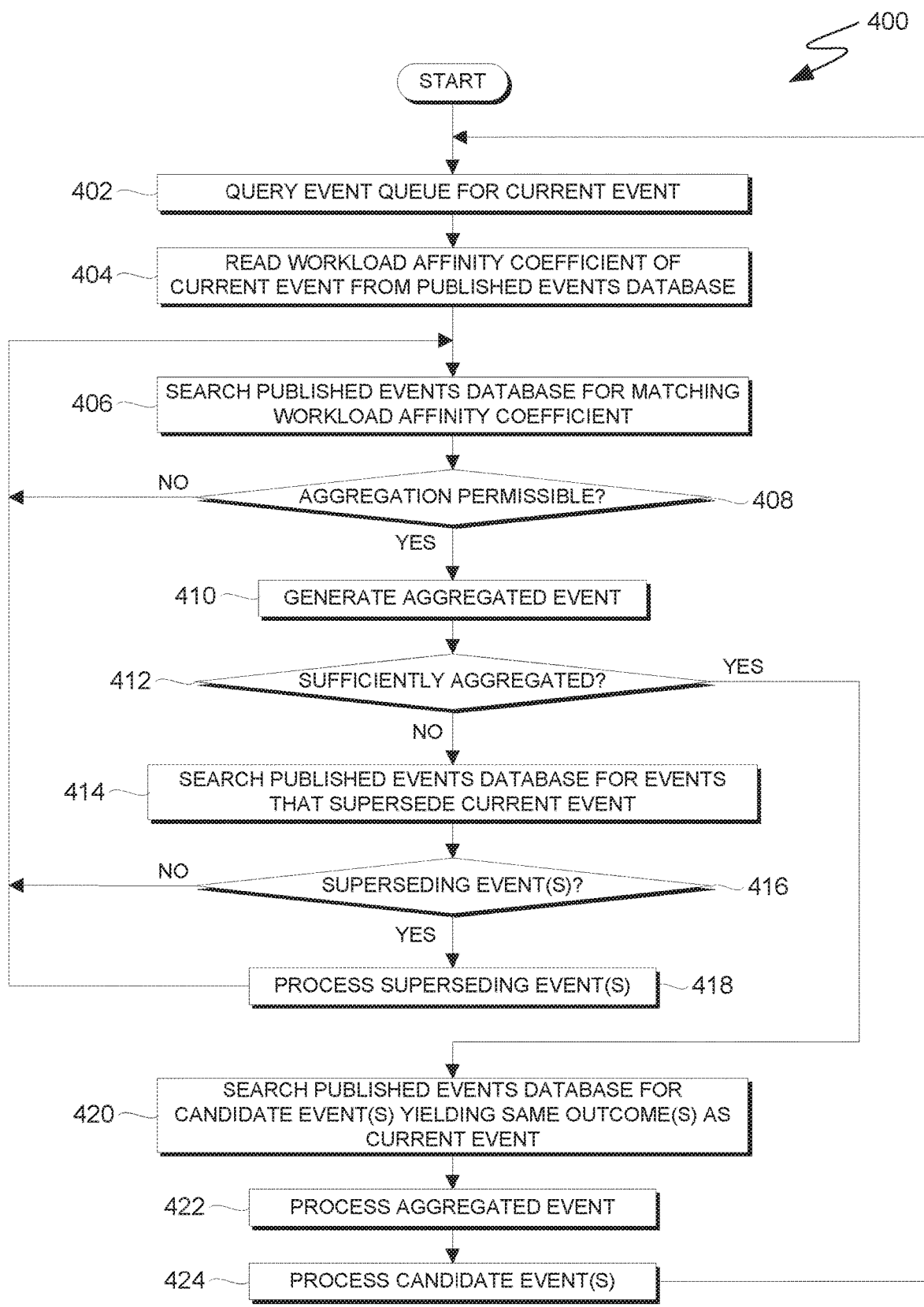
FIG. 4 is a flowchart depicting operations for aggregating and processing events in an event-driven system that supports event aggregation at the consumer, on a computing device within the computing environment of FIG. 1, in accordance with an embodiment of the present invention.

As described with respect to FIG. 4, dependency data like that depicted if FIGS. 3A and 3B can enable, at least in part, aggregation logic 113, while executing on consumer 110, to identify events that can be processed more efficiently in "combination" with a "current event."

FIG. 4 is a flowchart depicting operations for aggregating and processing events in an event-driven system that supports event aggregation at the consumer, on a computing device within the computing environment of FIG. 1, in accordance with an embodiment of the present invention. For example, FIG. 4 is a flowchart depicting operations 400 of aggregation logic 113 executing on a consumer 110 within computing environment 100. Consumer 110, while executing aggregation logic 113, executes an iteration of operations 400 for each event retrieved from published events database 115 prior to aggregating multiple events (i.e., for each event retrieved as a result of operation 402, as described herein).

In operation 402, aggregation logic 113 queries event queue 117 for a "current event." As used with respect to operations 400 of aggregation logic 113, a "current event" is an event for which aggregation logic 113 analyzes workload affinity coefficients and dependency data stored on published events database 115 to find events that can be aggregated with the current event or processed in order to generate events that are likely to aggregate with the current event, as described herein. In embodiments that omit event queue 117, aggregation logic 113 similarly queries published events database 115 for a "current event." In operation 404, aggregation logic 113 reads the workload affinity coefficient of the current event from published events database 115. As described with respect to FIG. 2, the workload affinity coefficient can, in various embodiments, be a hash value calculated from a string that includes an event name and one or more context values using a Java® "hashCode" method or another method for calculating suitable hash values.

In general, aggregation logic 113 uses one or more of three techniques to optimally aggregate events on consumer 110. Various embodiments utilize one technique to optimally aggregate events on consumer 110 or any combination of the three techniques to optimally aggregate events on consumer 110. Persons of ordinary skill in the art will understand that operations 400, as discussed with respect to FIG. 4, can be modified accordingly. One technique for identifying events that are likely to aggregate with the current event is to identify other event(s) that are associated with workload affinity coefficient(s) that have workload affinity coefficient(s) that match the workload affinity coefficient of the current event (i.e., events that are associated with identical hash values). Persons of ordinary skill in the art will understand that events having matching workload affinity coefficient(s) may differ with respect to other types of data or metadata that is associated with the events (i.e., data from which the workload affinity coefficients were not calculated). Accordingly, aggregation logic 113, in operation 406, searches published events database 115 for a workload affinity coefficient that matches the workload affinity coefficient of the current event. In general, events having matching workload affinity coefficients (i.e., "matching events," as used herein) are likely to reside on published events database 115 when separate, independent threads are publishing events in isolation on one or more of producers 105. In this type of situation, "aggregation at source" is not generally possible, and therefore, it is advantageous to execute aggregation logic 113 on consumer 110 in addition to executing, on producers 105, any program instructions that facilitate "aggregation at source."

In decision 408, aggregation logic 113 determines whether or not aggregation is permissible. If aggregation logic 113 determines that (i) the current event cannot be aggregated with an event identified in the most recent iteration of operation 406 (i.e., a matching event) or (ii) an event having a matching workload affinity coefficient was not found in the most recent iteration of operation 406 (decision 408, NO branch), aggregation logic 113 executes a subsequent iteration of operation 406 and decision 408. In some embodiments, aggregation logic 113 executes subsequent iterations of operation 406 and decision 408 in response to determining that aggregation is not permissible (e.g., a workload affinity coefficient does not match the workload affinity coefficient of the current event; decision 408, NO branch) so long as an amount of time spent executing operations 406 and 408 without identifying an event that can be aggregated with the current event based on matching workload affinity coefficients does not exceed a predetermined temporal threshold (e.g., 10 milliseconds or another period of time selected based on one or more properties of the computing environment depicted in FIG. 1 and/or a desired level of performance, such as a specific average latency metric) or a count of identified, matching events does not exceed a first threshold count of events. If aggregation logic 113 determines that aggregation is permissible (decision 408, YES branch), aggregation logic 113 aggregates the current event, and any previously identified events having matching workload affinity coefficients (i.e., any previously identified matching events), with the event identified in the most recent iteration of operation 406, thereby generating an aggregated event in operation 410.

In decision 412, aggregation logic 113 determines whether or not the aggregated event is sufficiently aggregated. In some embodiments, an aggregated event is sufficiently aggregated if the aggregated event describes a count of events that exceeds the first threshold count of events or another threshold count of events (e.g., an aggregated event that describes more than one hundred events where the first threshold count of events is one hundred events). In embodiments in which decision 412 is based on a threshold count of events, decision 412 can precede operation 410, and the instance of aggregation logic 113 can execute operation 410 subsequently to determining that an aggregated event is sufficiently aggregated (decision 412, YES branch). In other embodiments, an aggregated event is sufficiently aggregated if the aggregated event describes a percentage of the events stored on published events database 115 (or event queue 117) that exceeds a first threshold percentage of events described by data residing thereon (e.g., fifteen percent of events described by data residing thereon). Additionally, aggregation logic 113 can modify the first threshold count of events or the first threshold percentage of events based on efficiencies achieved via event aggregation at the consumer, thereby generating a second threshold count of events and a second threshold percentage of events. While it is generally advantageous to aggregate events as much as possible, embodiments of the present invention recognize that a sufficiently large volume of queries to published events database 115 to identify events for aggregations may result in unacceptable latency or resource utilization. Accordingly, some embodiments of the present invention determine that an event is sufficiently aggregated, regardless of whether or not any other metrics or thresholds are met with respect to this determination, if an amount of time (and/or similarly, resources) spent identifying events for aggregation with the current event exceeds the predetermined temporal threshold. Persons of ordinary skill in the art will understand that decision 412 can proceed operation 410 in embodiments in which decision 412 is based on data describing candidate events for aggregation.

If aggregation logic 113 determines that an aggregated event in not sufficiently aggregated (decision 412, NO branch), aggregation logic searches published events database 115 for events that "supersede" the current event in operation 414. As used with respect to operations 400 of aggregation logic 113, a "superseding event" is an event that, if processed prior to the current event, will likely generate events that are likely to aggregate with the aggregated event. This represents a second technique one of the three aforementioned techniques to optimally aggregate events on consumer 110. To determine if an event is a superseding event (decision 416), aggregation logic 113 analyses dependency data stored on published events database 115. If, for example, the current event is the event represented by "E_Valid<#1>", analyzing the dependency data depicted in FIG. 3B indicates that processing the events represented by "E_InTxnMapped<#1>" and "E_InTxnMapped<#2>" generated the event represented by "E_Valid<#1>". Analyzing the dependency data depicted in FIG. 3A indicates that the events represented by "E_Valid<#1>" have been generated seventy-five times as a result of processing the event represented by "E_InTxnMapped<#1>". Additionally, analyzing the dependency data depicted in FIG. 3A indicates that the event represented by "E_Valid<#1>" has been generated fifty-two times as a result of processing the event represented by "E_InTxnMapped<#2>".

If aggregation logic 113 identifies any superseding event(s) (decision 416, YES branch) in published events database 115 (or event queue 117), aggregation logic 113 processes the superseding event(s) (operation 418) and then searches published events database 115 for events having matching workload affinity coefficients (i.e., matching events; operation 406). In some embodiments, aggregation logic 113 processes, in operation 418, all events that aggregation logic 113 determined to be superseding events in decision 416. In other embodiments, aggregation logic 113 processes, in operation 418, less than all events that aggregation logic 113 determined to be superseding events in decision 416. In some embodiments, it may be advantageous to process less than all superseding events to reduce latency or resource utilization. Based on the dependency data depicted in FIG. 3A, for example, aggregation logic 113 can be configured to process the event represented by "E_InTxnMapped<#1>", if data describing any such events is stored in published events database 115, and not process the event represent by "E_InTxnMapped<#2>" because processing the event represented by "E_InTxnMapped<#1>" is likely to generate twenty-three more events that are likely to aggregate with the current event, the event represented by "E_Valid<#1>", than processing the event represented by "E_InTxnMapped<#2>". In the embodiment depicted in FIG. 4, aggregation logic 113 searches published workload database 115 for matching workload affinity coefficients (operation 406) if aggregation logic 113 determines that no superseding events are in published events database 115 (decision 416, NO branch). In some embodiments, aggregation logic 113 also determines, in operation 416, whether or not an updated amount of time spent identifying events for aggregation with the current event exceeds the predetermined temporal threshold discussed with respect to decision 412. If aggregation logic 113 determines that no superseding events are described by data stored in published events database 115 and the updated amount of time spend identifying events for aggregation with the current event exceeds the predetermined temporal threshold, aggregation logic 113 proceeds to operation 420.

If aggregation logic 113 determines that the aggregated event is sufficiently aggregated, as previously discussed (decision 412, YES branch), aggregation logic 113 searches published events database 115 for candidate event(s) that are likely to yield the same outcome(s) as the current event, in which case the outcome of the candidate event(s) are likely able to aggregate with the outcome(s) of current event (operation 420). This represents a third technique of the three aforementioned techniques to optimally aggregate events on consumer 110. If, for example, the current event is the event represented by "E_Valid<#1>", analyzing the dependency data depicted in FIG. 3A indicates that processing events represented by "E_Valid<#1>" will likely generate event(s) represented by "E_Next<#5>". Subsequently analyzing the dependency data depicted in FIG. 3B indicates that processing events represented by "E_Valid<#2>" is also likely to generate event(s) represented by "E_Next<#5>". The dependency data depicted in FIG. 3A similarly indicates that processing events represented by "E_Valid<#2>" will likely generate events represented by "E_Next<#5>". Accordingly, it is advantageous with respect to subsequent iterations of operations 400 if aggregation logic 113 processes the aggregated event (operation 422) and processes the candidate event(s) (operation 424).

In addition, it is advantageous for aggregation logic 113 to generate and update, over various iterations of operations 400, information describing the success rate of aggregating various events based on the operations and the decisions relating to one or more of the three techniques for optimally aggregating events on consumer 110, as described herein. For example, aggregation logic 113 generates, in various embodiments, data describing the outcomes of executing one or both of decision 416 and operation 420 over multiple iterations of operations 400 (i.e., "outcome data"). Based on the outcome data, it is possible to prioritize processing of events such that initial fragmentation of a workload is reduced or eliminated. Additionally, it is possible that one or more events of a plurality of events that supersede the current event and/or one or more events of a plurality of candidate events rarely are not likely to occur within a period of time defined by an iteration of operations 400. Generating data describing the frequency with which specific events occur can permit aggregation logic 113 to more optimally select events from among a plurality of events that supersede the current event and/or a plurality of candidate events to advantageously improve the performance of the event-driven system by, for example, reducing latency associated with aggregating events at consumer 110.

Figure 5:
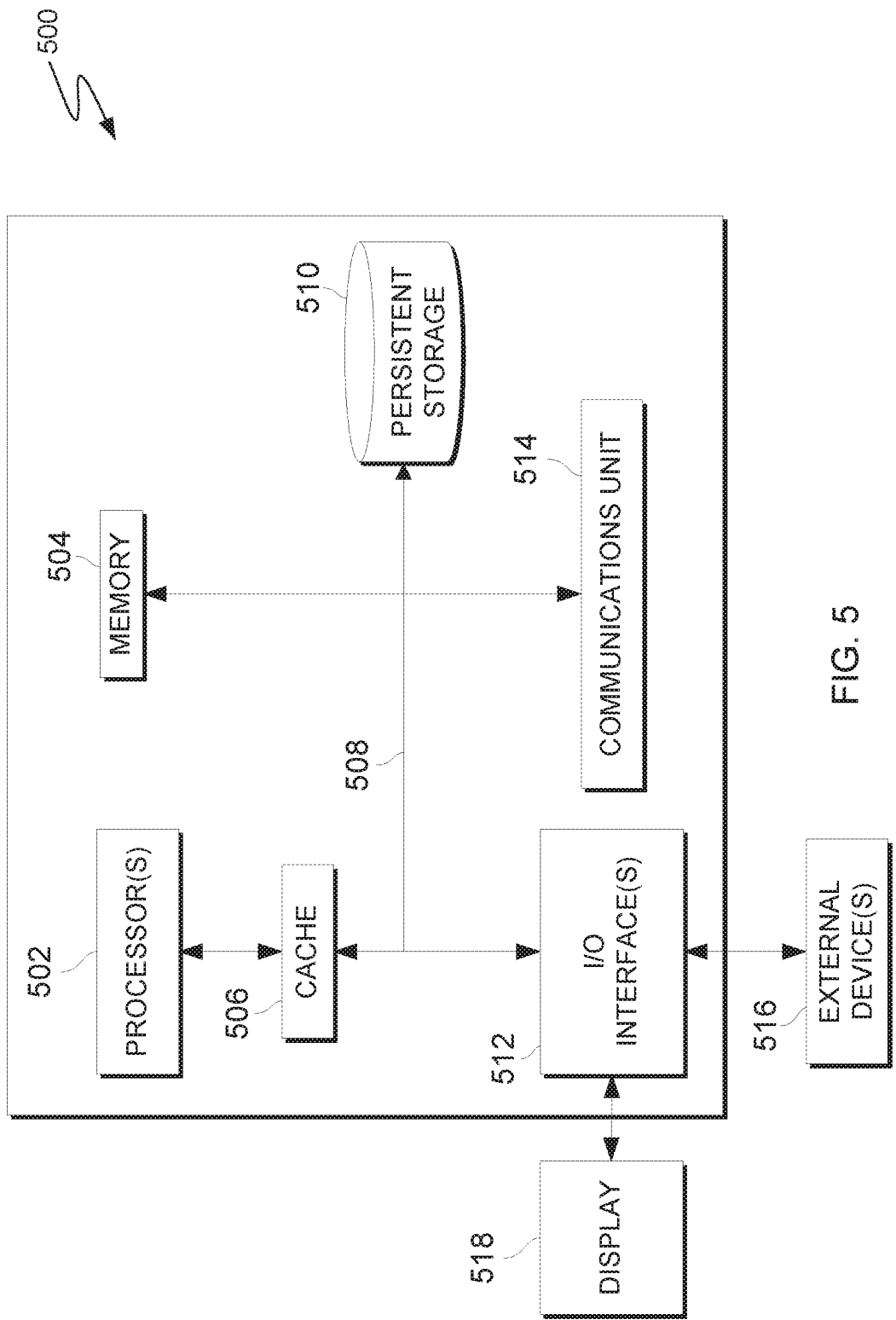
FIG. 5 is a block diagram of components of a computing device executing operations as part of an event-driven system that supports event aggregation at a consumer, in accordance with an embodiment of the present invention.

FIG. 5 is a block diagram of components of a computing device, generally designated 500, in accordance with an embodiment of the present invention. In one embodiment, computing system 500 is representative of one or both of a producer of producers 105 and consumer 110 within computing environment 100, as described with respect to FIG. 1.

It should be appreciated that FIG. 5 provides only an illustration of one implementation and does not imply any limitations with regard to the environments in which different embodiments may be implemented. Many modifications to the depicted environment may be made.

Computing system 500 includes processor(s) 502, cache 506, memory 504, persistent storage 510, input/output (I/O) interface(s) 512, communications unit 514, and communications fabric 508. Communications fabric 508 provides communications between cache 506, memory 504, persistent storage 510, communications unit 514, and input/output (I/O) interface(s) 512. Communications fabric 508 can be implemented with any architecture designed for passing data and/or control information between processors (such as microprocessors, communications and network processors, etc.), system memory, peripheral devices, and any other hardware components within a system. For example, communications fabric 508 can be implemented with one or more buses or a crossbar switch.

Memory 504 and persistent storage 510 are computer readable storage media. In this embodiment, memory 504 includes random access memory (RAM). In general, memory 504 can include any suitable volatile or non-volatile computer readable storage media. Cache 506 is a fast memory that enhances the performance of processor(s) 502 by holding recently accessed data, and data near recently accessed data, from memory 504.

Program instructions and data used to practice embodiments of the present invention may be stored in persistent storage 510 and in memory 504 for execution by one or more of the respective processor(s) 502 via cache 506. In an embodiment, persistent storage 510 includes a magnetic hard disk drive. Alternatively, or in addition to a magnetic hard disk drive, persistent storage 510 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 510 may also be removable. For example, a removable hard drive may be used for persistent storage 510. Other examples include optical and magnetic disks, thumb drives, and smart cards that are inserted into a drive for transfer onto another computer readable storage medium that is also part of persistent storage 510.

Communications unit 514, in these examples, provides for communications with other data processing systems or devices. In these examples, communications unit 514 includes one or more network interface cards. Communications unit 514 may provide communications through the use of either or both physical and wireless communications links. Program instructions and data used to practice embodiments of the present invention may be downloaded to persistent storage 510 through communications unit 514.

I/O interface(s) 512 allows for input and output of data with other devices that may be connected to computer system 500. For example, I/O interface(s) 512 may provide a connection to external device(s) 516 such as a keyboard, keypad, a touch screen, and/or some other suitable input device. External device(s) 516 can also include portable computer readable storage media such as, for example, thumb drives, portable optical or magnetic disks, and memory cards. Software and data used to practice embodiments of the present invention can be stored on such portable computer readable storage media and can be loaded onto persistent storage 510 via I/O interface(s) 512. I/O interface(s) 512 also connect to display 518.

Display 518 provides a mechanism to display or present data to a user and may be, for example, a computer monitor.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, a list of alternatives such as "at least one of A, B, and C" should be interpreted to mean "at least one A, at least one B, at least one C, or any combination of A, B, and C."

Additionally, the phrase "based on" should be interpreted to mean "based, at least in part, on."

The term "exemplary" means of or relating to an example and should not be construed to indicate that any particular embodiment is preferred relative to any other embodiment.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for optimizing event aggregation in an event-driven system, the method comprising:

querying, by one or more computer processors of a consumer, an event queue for a current event, wherein the event queue is populated with events, at least in part, by one or more producers;

reading, by one or more computer processors of the consumer, a workload affinity coefficient that describes, at least in part, the current event;

searching, by one or more computer processors of the consumer, a database for one or more matching workload affinity coefficients; and aggregating, by one or more computer processors of the consumer, the current event and one or more events that are respectively associated with the one or more matching workload affinity coefficients, thereby generating an aggregated event, wherein an aggregated event represents a plurality of events that are processed by the consumer as a single event; and in response to determining, by one or more computer processors of the consumer, that the aggregated event has not reached a threshold level of aggregation:

searching, by one or more computer processors of the consumer, a first data structure stored on the database, the first data structure representing dependency data including (i) a key column that identifies one or more subsequent events and (ii) a list column that, for each subsequent event in the key column, associates one or more preceding events that caused at least one instance of the associated subsequent event to publish;

identifying, by one or more computer processors of the consumer, the current event as a subsequent event in the key column of the first data structures;

identifying, by one or more computer processors of the consumer, one or more preceding events that are associated with the current event via the list column of the first data structure as one or more superseding events that will generate one or more events that will further aggregate with the aggregated event, wherein a preceding event in the first data structure is a superseding event if the associated subsequent event in the first data structure is the current event;

processing, by one or more computer processors of the consumer, the one or more superseding events that will generate events that will further aggregate with the aggregated event;

aggregating with the aggregated event, by one or more computer processors of the consumer, one or more events generated as a result of processing the one or more superseding events;

in response to determining that the aggregated event has reached the threshold level of aggregation:

searching, by one or more computer processors of the consumer, a second data structure stored on the database for the current event, the second data structure representing dependency data including (i) a key column that identifies one or more preceding events and (ii) a list column that, for each preceding event in the key column, associates one or more subsequent events that were published in response to publishing the associated preceding event;

identifying, by one or more computer processors of the consumer, (i) the current event as a preceding event in the key column of the second data structure and (ii) a subsequent event that is associated with the current event via the list column of the second data structure;

searching, by one or more computer processors of the consumer, the key column of the first data structure for the subsequent event that is associated with the current event via the second data structure, and in response, identifying, by one or more computer processors of the consumer, one or more preceding events in the list column of the first data structure as one or more candidate events, wherein a preceding event in the first data structure is a candidate event if the associated subsequent event in the first data structure is, in the second data structure, a subsequent event of the current event, and wherein a candidate event is an event that, when processed, will generate one or more events that will aggregate with one or more events generated as a result of processing the aggregated event;

processing, by one or more computer processors of the consumer, the aggregated event; and processing, by one or more computer processors of the consumer, the one or more candidate events.

2. The method of claim 1, wherein the threshold level of aggregation is based on a threshold count of events that are aggregated with the current event.

3. The method of claim 1, wherein the threshold level of aggregation is based on a threshold percentage of events in the database that are aggregated with the current event.

4. The method of claim 1, wherein the workload affinity coefficient that describes the current event and the one or more matching workload affinity coefficients are hash values calculated, by one or more computer processors of a producer, based on respective strings that include respective events names and one or more respective context values.

5. A computer program product for optimizing event aggregation in an event-driven system, the computer program product comprising:

a computer readable storage device and program instructions stored on the computer readable storage device, the program instructions comprising:

program instructions to, at a consumer, query event queue for a current event;

program instructions to, at the consumer, read a workload affinity coefficient that describes, at least in part, the current event;

program instructions to, at the consumer, search a database for one or more matching workload affinity coefficients; and program instructions to, at the consumer, aggregate the current event and one or more events that are respectively associated with the one or more matching workload affinity coefficients, thereby generating an aggregated event, wherein an aggregated event represents a plurality of events that are processed by the consumer as a single event;

in response to program instructions to determine that the aggregated event has not reached a threshold level of aggregation:

program instructions to, at the consumer, search a first data structure stored on the database, the first data structure representing dependency data including (i) a key column that identifies one or more subsequent events and (ii) a list column that, for each subsequent event in the key column, associates one or more preceding events that caused at least one instance of the associated subsequent event to publish;

program instructions to, at the consumer, identify the current event as a subsequent event in the key column of the first data structures;

program instructions to, at the consumer, identify one or more preceding events that are associated with the current event via the list column of the first data structure as one or more superseding events that will generate one or more events that will further aggregate with the aggregated event, wherein a preceding event in the first data structure is a superseding event if the associated subsequent event in the first data structure is the current event;

program instructions to, at the consumer, process the one or more superseding events that will generate events that will further aggregate with the aggregated event;

program instructions to, at the consumer, aggregate with the aggregated event one or more events generated as a result of processing the one or more superseding events;

in response to program instructions to determine that the aggregated event has reached the threshold level of aggregation:

program instructions to, at the consumer, search a second data structure stored on the database for the current event, the second data structure representing dependency data including (i) a key column that identifies one or more preceding events and (ii) a list column that, for each preceding event in the key column, associates one or more subsequent events that were published in response to publishing the associated preceding event;

program instruction to, at the consumer, identify (i) the current event as a preceding event in the key column of the second data structure and (ii) a subsequent event that is associated with the current event via the list column of the second data structure;

program instruction to, at the consumer, search the key column of the first data structure for the subsequent event that is associated with the current event via the second data structure, and in response, identify, at the consumer, one or more preceding events in the list column of the first data structure as one or more candidate events, wherein a preceding event in the first data structure is a candidate event if the associated subsequent event in the first data structure is, in the second data structure, a subsequent event of the current event, and wherein a candidate event is an event that, when processed, will generate one or more events that will aggregate with one or more events generated as a result of processing the aggregated event;

program instructions to, at the consumer, process the aggregated event; and program instructions to, at the consumer, process the one or more candidate events.

6. The computer program product of claim 5, wherein the threshold level of aggregation is based on a threshold count of events that are aggregated with the current event.

7. The computer program product of claim 5, wherein the threshold level of aggregation is based on a threshold percentage of events in the database that are aggregated with the current event.

8. A computer system for optimizing event aggregation in an event-driven system, the computer system comprising:
one or more computer processors;
one or more computer readable storage devices;
program instructions stored on the one or more computer readable storage devices for execution by at least one of the one or more processors, the program instructions comprising:

program instructions to, at a consumer, query event queue for a current event;

program instructions to, at the consumer, read a workload affinity coefficient that describes, at least in part, the current event;

program instructions to, at the consumer, search a database for one or more matching workload affinity coefficients; and program instructions to, at the consumer, aggregate the current event and one or more events that are respectively associated with the one or more matching workload affinity coefficients, thereby generating an aggregated event, wherein an aggregated event represents a plurality of events that are processed by the consumer as a single event;

in response to program instructions to determine that the aggregated event has not reached a threshold level of aggregation:

program instructions to, at the consumer, search a first data structure stored on the database, the first data structure representing dependency data including (i) a key column that identifies one or more subsequent events and (ii) a list column that, for each subsequent event in the key column, associates one or more preceding events that caused at least one instance of the associated subsequent event to publish;

program instructions to, at the consumer, identify the current event as a subsequent event in the key column of the first data structures;

program instructions to, at the consumer, identify one or more preceding events that are associated with the current event via the list column of the first data structure as one or more superseding events that will generate one or more events that will further aggregate with the aggregated event, wherein a preceding event in the first data structure is a superseding event if the associated subsequent event in the first data structure is the current event;

program instructions to, at the consumer, process the one or more superseding events that will generate events that will further aggregate with the aggregated event;

program instructions to, at the consumer, aggregate with the aggregated event one or more events generated as a result of processing the one or more superseding events;

in response to program instructions to determine that the aggregated event has reached the threshold level of aggregation:

program instructions to, at the consumer, search a second data structure stored on the database for the current event, the second data structure representing dependency data including (i) a key column that identifies one or more preceding events and (ii) a list column that, for each preceding event in the key column, associates one or more subsequent events that were published in response to publishing the associated preceding event;

program instruction to, at the consumer, identify (i) the current event as a preceding event in the key column of the second data structure and (ii) a subsequent event that is associated with the current event via the list column of the second data structure;

program instruction to, at the consumer, search the key column of the first data structure for the subsequent event that is associated with the current event via the second data structure, and in response, identify, at the consumer, one or more preceding events in the list column of the first data structure as one or more candidate events, wherein a preceding event in the first data structure is a candidate event if the associated subsequent event in the first data structure is, in the second data structure, a subsequent event of the current event, and wherein a candidate event is an event that, when processed, will generate one or more events that will aggregate with one or more events generated as a result of processing the aggregated event;

program instructions to, at the consumer, process the aggregated event; and program instructions to, at the consumer, process the one or more candidate events.

9. The computer system of claim 8, wherein the threshold level of aggregation is based on a threshold count of events that are aggregated with the current event.

10. The computer system of claim 8, wherein the threshold level of aggregation is based on a threshold percentage of events in the database that are aggregated with the current event.

11. The computer system of claim 8, wherein the workload affinity coefficient that describes the current event and the one or more matching workload affinity coefficients are hash values calculated at a producer based on respective strings that include respective events names and one or more respective context values.

12. The computer program product of claim 5, wherein the workload affinity coefficient that describes the current event and the one or more matching workload affinity coefficients are hash values calculated at a producer based on respective strings that include respective events names and one or more respective context values.

13. The method of claim 1, wherein identifying, by one or more computer processors of the consumer, one or more preceding events that are associated with the current event via the list column of the first data structure as one or more superseding events that will generate one or more events that will further aggregate with the aggregated event further comprises:

identifying, by one or more computer processors of the consumer, at least two preceding events that are associated with the current event via the list column of the first data structure as one or more superseding events;

for each superseding event identifying, by one or more computer processors of the consumer, a count of occurrences in the first data structure, the count of occurrences in the first data structure representing a count of instances in which an associated subsequent event identified in the key column of the first data structure was published in response to an associated preceding event identified in the list column of the first data structure being published; and in response to identifying, by one or more computer processors of the consumer, a first superseding event having a highest count of occurrences in the first data structure, processing, by one or more computer processors of the consumer, the first superseding event having the highest count of occurrences in the first data structure and not processing a second superseding event having a lower count of occurrences in the first data structure to generate the one or more events that will further aggregate with the aggregated event.

14. The method of claim 13, wherein processing the superseding event having the highest count of occurrences in the first data structure and not processing a second superseding event having a lower count of occurrences in the first data structure reduces latency.

15. The method of claim 13, wherein processing the superseding event having the highest count of occurrences in the first data structure and not processing a second superseding event having a lower count of occurrences in the first data structure reduces resource utilization.

16. The method of claim 13, further comprising:

updating, by one or more computer processors of the consumer, outcome data for the first superseding event, the updated outcome data for the first superseding event describing whether or not processing the first superseding event generated an event that could be aggregated with current event; and selecting, by one or more computer processors of the consumer, a third superseding event based on the outcome data.

17. The method of claim 1, further comprising:

updating, by one or more computer processors of the consumer, outcome data for the one or more candidate events, the outcome data for the one or more candidate events describing whether or not processing the one or more candidate events generated one or more events that could be aggregated with one or more events generated by processing the aggregated event; and for a subsequent instance of the current event, selecting, by one or more computer processors of the consumer, a subsequent set of one or more candidate events based on the outcome data for the one or more candidate events.

* * * * *